Figure 1:
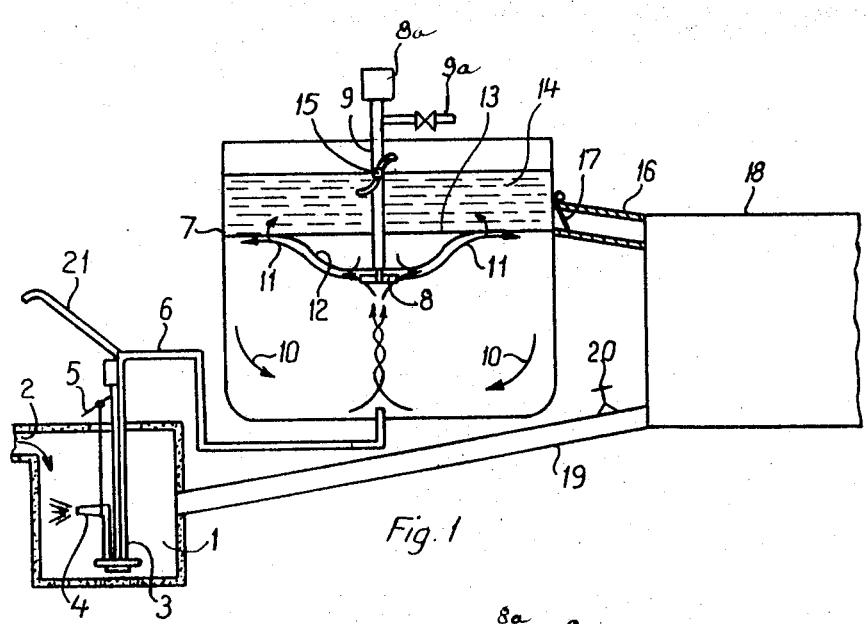

United States Patent [19]
Fuchs

[11] 3,864,247
[45] Feb. 4, 1975

[54] BIOLOGICAL DECOMPOSITION OF ORGANIC MATERIAL BY THERMOPHILIC MICROORGANISMS

[75] Inventor: Hubert K. E. Fuchs, Mayen, Germany

[73] Assignee: The De Laval Separator Company, Poughkeepsie, N.Y.

[22] Filed: Aug. 23, 1972

[21] Appl. No.: 282,980

Related U.S. Application Data

[63] Continuation-in-part of Ser. No. 128,097, March 25, 1971, Pat. No. 3,745,113.

[52] U.S. Cl. .................................. 210/12, 210/15
[51] Int. Cl. .............................................. C02c 1/02
[58] Field of Search ........... 210/12, 13, 14, 15, 197, 210/221, 219

[56] References Cited
UNITED STATES PATENTS

| | | | |
|---|---|---|---|
| 3,224,964 | 12/1965 | Derenk et al. ..................... | 210/13 X |
| 3,401,113 | 9/1968 | Pruessner et al. ................. | 210/11 X |
| 3,462,275 | 8/1969 | Bellamy ............................. | 210/15 X |
| 3,535,234 | 10/1970 | Gilwood ............................. | 210/12 X |
| 3,607,737 | 9/1971 | Gamer ................................ | 210/12 |
| 3,745,113 | 7/1973 | Fuchs ................................. | 210/12 |

OTHER PUBLICATIONS

Kambhv,K, et al., Aerobic Thermophilic Process, etc., Jour. WPCF, Vol. 41, May 1969, pp. R-127 thru R-141 (P.O.S.L.).

Primary Examiner—Samih N. Zaharna
Assistant Examiner—B. Castel
Attorney, Agent, or Firm—Cyrus S. Hapgood

[57] ABSTRACT

An aqueous liquid containing organic material and having a biologic oxygen demand during five days of at least 1,500 mg of oxygen gas per liter of the liquid is supplied to a treatment vessel where, in the presence of thermophilic microorganisms, it is intimately contacted with oxygen in a quantity corresponding to at least 1.1 times and at most 6 times the quantity of oxygen which theoretically can be consumed by the organic material by means of the microorganisms, the liquid being kept heat-insulated and without heat addition being maintained by the heat-producing activity of the microorganisms at a temperature of at least 42° C.

1 Claim, 2 Drawing Figures

PATENTED FEB 4 1975 3,864,247

INVENTOR.
HUBERT K·E· FUCHS
BY
Dann, Hope, Faithful & Hapgood
Attorneys

BIOLOGICAL DECOMPOSITION OF ORGANIC MATERIAL BY THERMOPHILIC MICROORGANISMS

This application is a continuation-in-part of my copending application Ser. No. 128,097, filed Mar. 25, 1971, and now U.S. Pat. No. 3,745,113.

The present invention relates to a method for the biological decomposition of organic material by means of thermophilic microorganisms.

In the common biological decomposition of materials such as sludge from municipal or industrial waste water or manure, while blowing in air but without temperature increase, the quantity of organic material is not reduced to the desired degree, and the decomposition residue to a large extent consists of a mass of bacteria. In addition, pathogenic bacteria and various kinds of virus, worm ova and weed seeds remain in this mass.

The present invention has for its principal object the provision of an improved method for biological decomposition which is operable at varying outdoor temperatures.

According to the invention, a treatment vessel is supplied with an aqueous liquid containing organic material and having a biologic oxygen demand during five days of at least 1,500 mg, preferably at least 5,000 mg, of oxygen gas per liter of liquid. In the treatment vessel, the liquid is brought into intimate contact with oxygen in a quantity corresponding to at least 1.1 times and at most six times, preferably at most four times, the quantity of oxygen which theoretically can be consumed by the organic material by means of the microorganisms, the liquid being kept heat-insulated and without heat addition being kept heated by the activity of the microorganisms to a temperature of at least 42°C, preferably 50° to 58°C.

Experiments have shown that this method makes it possible to destroy, with the help of the thermophilic microorganisms, the pathogenic bacteria and various kinds of virus, worm ova and weed seeds and in addition decompose such materials as mineral oils, washing agents, hair and feathers. Furthermore, the quantity of organic material is reduced to a fraction of the starting quantity. This latter circumstance depends on the oxidation of the organic material which takes place. Furthermore, the treated liquid is odorless and the decomposition process proper takes a time of only 6 to 10 days as compared with 30 days in prior common methods. The oxygen may be supplied by intimately contacting the liquid with air, oxygen-enriched air or pure oxygen; and the degree of utilization of the supplied oxygen is normally 50 to 70%. Thus, the oxygen percentage in the liquid during the decomposition treatment is advantageously kept at a value of only 0 to 0.5 mg $O_2$/liter. The specified biologic oxygen demand of the liquid is necessary to provide the heat development for maintaining the liquid at a temperature of at least 42°C.

At the start of the process, the heat development which is effected by the activity of the mesophilic microorganisms can be used for the heating of the liquid to the temperature where the thermophilic organisms are active. When the temperature rises substantially above 42°C, the activity of the mesophilic organisms decreases appreciably, and the heat development necessary in the continued process is then generated by the thermophilic organisms. If the liquid to be treated does not contain the microorganisms necessary for the process, the liquid can be inoculated with such organisms.

The intimate contact between the supplied oxygen-containing gas and the liquid is preferably effected by revolving the liquid in the treatment vessel.

In those cases where a foam is developed by the liquid in the decomposition of its content of organic material, the foam can be allowed to form a heat insulation for the liquid surface. Since the foam layer has a tendency to increase in thickness, it is desirable to withdraw foam after the foam layer has reached a thickness of at least 10 cm. The foam layer thickness can be kept limited in a conventional manner, for example, mechanically by means for breaking down the foam.

The revolution of the liquid in the treatment vessel advantageously takes place in a vertical plane, in that air introduced into the liquid in the form of fine bubbles has a tendency to rise and thereby promote such revolution of the liquid.

Foam formed in the biologic decomposition can be discharged from the vessel for separate use, such as the recovery of the protein content of the foam for feeding purposes.

Figure 2:
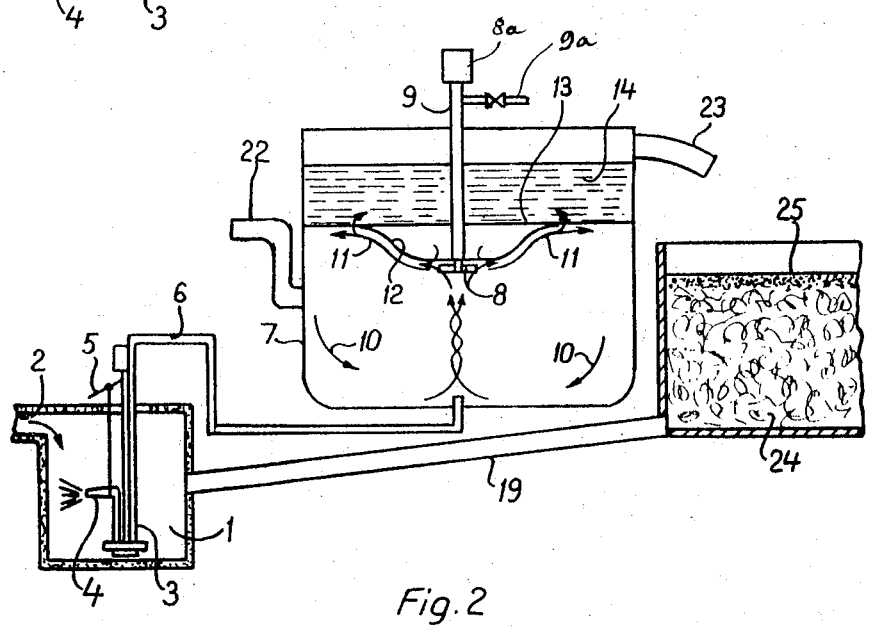

The invention is described more in detail in the following, reference being had to the accompanying drawing in which FIGS. 1 and 2 are schematic views of two different embodiments of a system for carrying out the present method.

In FIG. 1, a mixing container 1 for the liquid to be treated is provided with a liquid inlet 2. The liquid is well agitated by means of a pump 3 which sucks in liquid present in the container and ejects the same liquid through a nozzle 4, until a satisfactory agitation has been attained. Thereafter, the pump 3 is shifted by means of a lever 5 so as to pump liquid through a pipeline 6 to a vessel 7 for effecting biological decomposition of the liquid's content of organic material. The liquid in vessel 7 is assumed to contain the strains of microorganisms necessary for the treatment. The vessel 7 is provided with a device for effecting the revolution of the liquid and the air supply to the liquid and which can be of the same kind as that disclosed in Austrian U.S. Pat. No. 276,262. The device comprises a propeller 8, driven by a motor 8a, and an air supply tube 9 concentrically surrounding the propeller shaft. This tube receives air from a valved supply line 9a and opens just above the propeller, whereby the air supplied downward through the tube is dispersed by the propeller into small bubbles which accompany the liquid in its revolving movements, as indicated by the arrows 10 and 11. The revolving movements are guided by a round bowl 12 with a central bottom hole 12a, below which the propeller 8 is provided. Above the liquid surface 13 there is a foam layer 14. A rotary knife 15, driven by a motor (not shown), is mounted on the tube 9 and tears asunder the foam in the center of the vessel and imparts to the foam a vertical rotary movement, clockwise to the left of the tube 9 and counter-clockwise to the right of the tube. When pumping new liquid into the vessel 7 through the pipeline 6, a corresponding quantity of liquid together with foam discharges through an outlet 16, after a flap valve 17 inserted in this outlet has been opened. The discharged liquid and foam and accompanying sediment are collected in a large vat 18. A pipeline 19 with a shut-off valve 20 inserted therein extends from this vat to the container 1. On a suitable occasion, when the container 1 is emptied, the valve 20 is opened so that liquid flows from the vat 18 down into the container 1. From there, the liquid is pumped by the pump 3 to a tank car through a pipe 21, to which the pump outlet is now connected instead of to the pipeline 6 or nozzle 4.

In the system according to FIG. 2, the vessel 7 is provided with an overflow outlet pipe 22 for treated liquid and accompanying sediment. The foam which has been developed during the treatment discharges continuously through an overflow outlet 23 and is gathered on a filter bed 24. Solids accompanying the foam deposit on the upper side of the filter bed as a layer 25 when the foam sinks. Liquid formed by the foam flows through the pipeline 19 back to the container 1 and is thereafter subjected to a new treatment in the vessel 7. This embodiment is especially suitable when the liquid contains components of low specific gravity which are impossible to decompose, such as fibers in waste water from the paper pulp industry. These solids accompany the foam and can be recovered from the surface of the filter bed 24.

EXAMPLES 1. 10 m$^3$ of whey with 0.21 % decomposable organic substance (= 0.12 % carbon) from a dairy were supplied per 24 hours to a continuously operating plant for biologic decomposition, the plant being equipped with a well heat-insulated treatment vessel. The whey had a temperature of 42°C and a BOD$_5$ (= biologic or biochemical oxygen demand during five days) of 1,500 mg/liter. 1,500 m$^3$ of air at a temperature of +10°C (winter temperature) were blown per 24 hours into the treatment vessel. The temperature in the treatment vessel remained at 42°C. The whey content of organic material was decomposed to 98°C. The oxygen efficiency (the utilization degree of the oxygen in the supplied air) was 16.5%.

2. 10 m$^3$ of pig's manure with 5.6 % of decomposable organic substance (= 3.0 % carbon) at a temperature of +18°C were supplied per 24 hours directly from a pig's shed, where a room temperature of +22°C prevailed, to a plant similar to that in the preceding example. The BOD$_5$ of the pig's manure was 21.000 mg/liter. 31.000 m$^3$ of air at an average day temperature of −15°C were blown per 24 hours into the treatment vessel during a cold period. The temperature in the treatment vessel remained at 43°C. The manure content of organic material was decomposed to 95 to 98 %. The oxygen efficiency was 20 %.

3. 10 m$^3$ of manure with 5.2 % of decomposable organic substance (= 2.8 % carbon) at a temperature of +18°C were supplied per 24 hours from the manure basin of a pig's shed to a plant similar to that in Example 1. The BOD$_5$ of the manure was 21.000 mg/liter. 37.000 m$^3$ of air at a temperature of +10°C were blown per 24 hours into the treatment vessel. The temperature in the treatment vessel remained at 42°C. The manure content of organic material was decomposed to 95 to 98 %. The oxygen efficiency was 16.5 %.

4. 10 m$^3$ of manure of the same kind as that in Example 2 at a temperature of +2°C were supplied per 24 hours from the manure basin of a pig's shed to a plant similar to that stated in Example 1. The BOD$_5$ of the manure was 21.000 mg/liter. 12.000 m$^3$ of air at an average day temperature of −15°C were blown per 24 hours into the treatment vessel during a cold period. The temperature in the treatment vessel remained at 55°C. The manure content of organic material was decomposed to 95 to 98 %. The oxygen efficiency was 50 %.

If it is difficult to maintain the desired putrefaction temperature in the treatment vessel, it is preferable to supply air enriched with oxygen, or even pure oxygen, in place of atmospheric air, thereby counteracting the loss of heat which the nitrogen content of the atmospheric air causes.

The scientific definition biochemical (biologic) oxygen demand during five days (BOD$_5$) means the quantity by weight of oxygen, which is consumed by the micro-organisms, so as to decompose oxydatively at 20°C organic substances, contained in water.

I claim:

1. A method for biologically decomposing organic material by means of thermophilic microorganisms, said method comprising the steps of supplying to a treatment vessel an aqueous liquid containing organic material and having a biologic oxygen demand during five days of at least 1,500 mg of oxygen gas per liter of liquid, intimately contacting the liquid in said vessel, and in the presence of thermophilic microorganisms, with oxygen in a quantity corresponding to at least 1.1 times and at most 6 times the quantity of oxygen which theoretically can be consumed by the organic material by means of the thermophilic microorganisms, and during said contacting step, and without heat addition, maintaining the liquid heat-insulated and heated to a temperature of at least 42° C by the heat-producing activity of the thermophilic microorganisms, the liquid at the start of the biologic decomposition being heated by the activity of mesophilic microorganisms to said temperature of at least 42° C where the thermophilic microorganisms are active.

* * * * *